Patented June 2, 1953

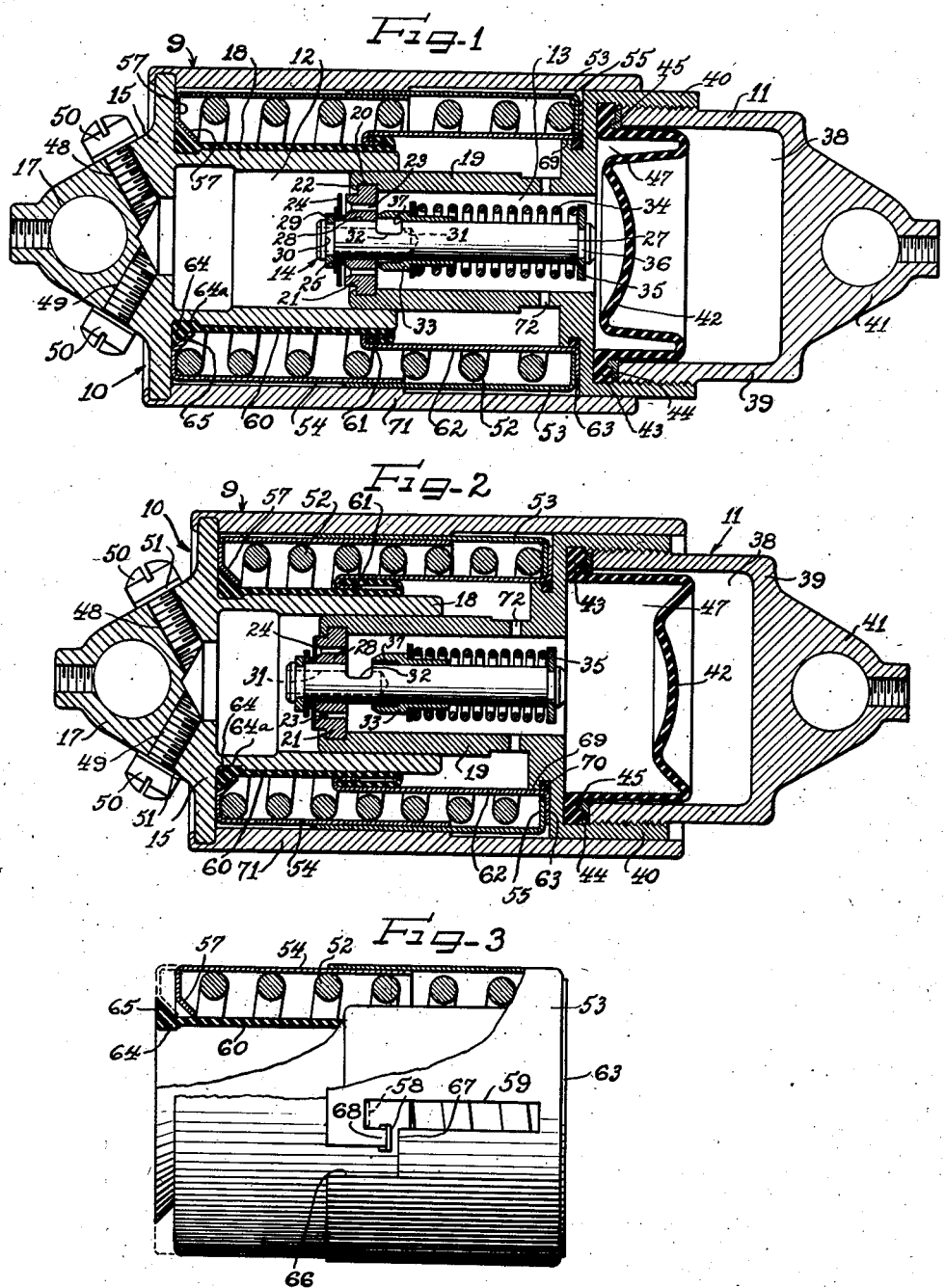

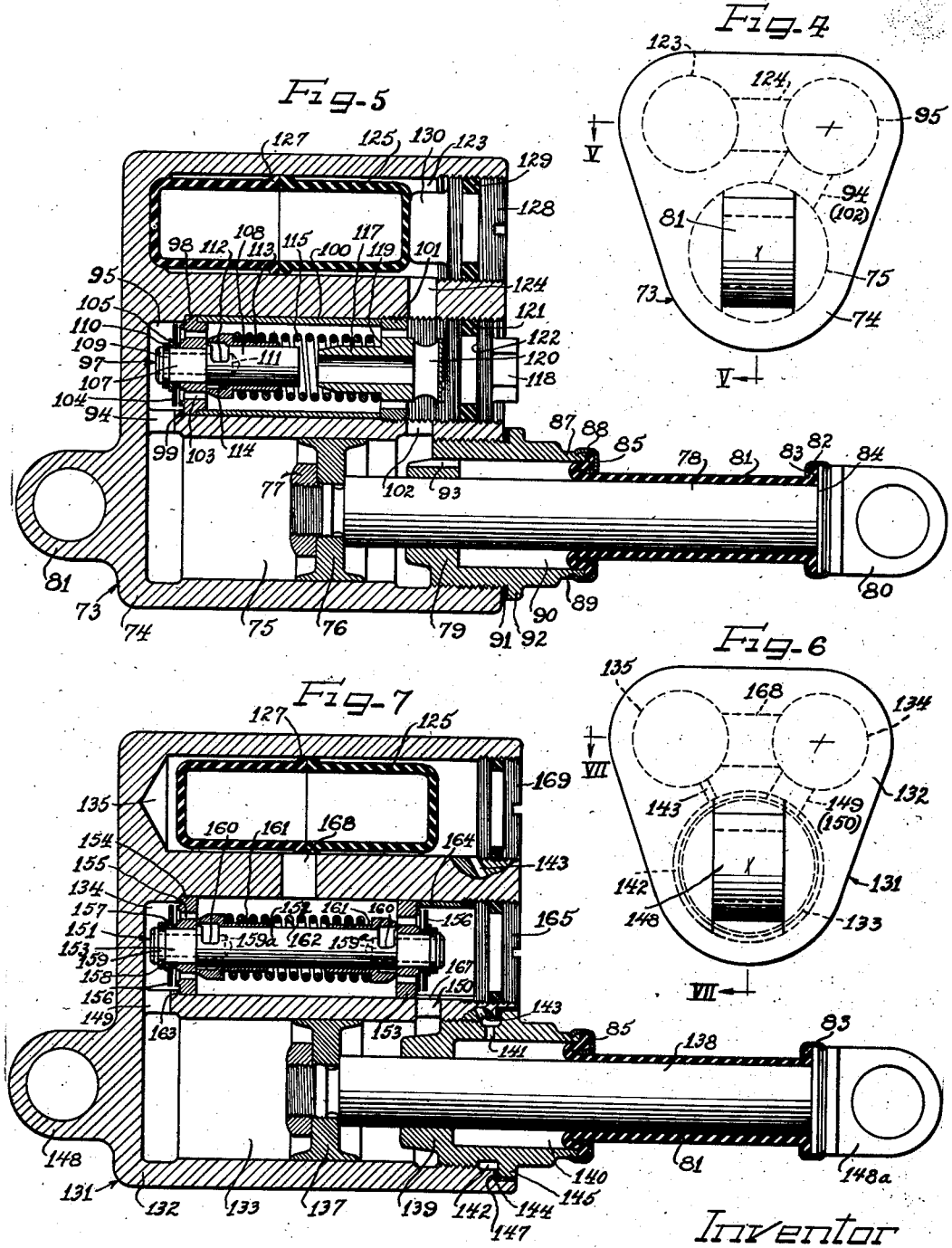

2,640,693

UNITED STATES PATENT OFFICE 2,640,693

RECIPROCATING PISTON TYPE HYDRAULIC DAMPING MECHANISM

Gervase M. Magrum, Buffalo, N. Y., assignor to Houdaille-Hershey Corporation, Detroit, Mich., a corporation of Michigan Application February 21, 1946, Serial No. 649,241

8 Claims. (Cl. 267—8)

This invention relates to improvements in reciprocating piston type hydraulic damping mechanisms such as are adapted for use in machine tools, textile machinery, laundry machinery, aircraft, etc. For such uses, the damping of relative motion between moving parts of the machinery or apparatus must be absolutely positive, leakage generally cannot be tolerated, available space for the damper is usually quite limited, and low damper cost is imperative.

An important object of the present invention is to meet the foregoing and other requirements in reciprocating piston type hydraulic damping mechanism, and in such a manner as to meet a wide variety of practical installation needs.

Another object of the invention is to provide reciprocating piston type of hydraulic damping mechanism in which the conventional type of oil seals and packings about the reciprocating piston rod are eliminated.

A further object of the invention is to provide in a hydraulic damping device new and improved means for preventing leakage of the hydraulic fluid past the piston structure.

Yet another object of the invention is to provide an improved hydraulic damping device in which aeration or frothing and the formation of air pockets is entirely avoided.

Still another object of the invention is to provide hydraulic damping mechanism having improved fluid replenishing means.

A further object of the invention is to provide a hydraulic damping device having an improved control valve structure.

A still further object of the invention is to provide a reciprocating piston type of hydraulic damping device of unusual compactness and high operating capacity and efficiency.

Other objects, features and advantages of the present invention will be readily apparent from the following detailed description taken in conjunction with the accompanying two sheets of drawings, in which:

Figure 1 is a longitudinal sectional view through a hydraulic damping device embodying the features of the present invention and showing the same in substantial maximum operational expanded condition;

Figure 2 is a similar longitudinal sectional view of the device showing it in a relatively contracted operative condition;

Figure 3 is a side elevational view, partially in section, of the piston sealing and return spring structure used in the device in Figures 1 and 2;

Figure 4 is an end elevational view of a modified form of the invention;

Figure 5 is a longitudinal detail view taken substantially on the irregular line V—V of Figure 4;

Figure 6 is an end elevational view of a further modified form of the invention; and Figure 7 is a longitudinal sectional detail view through the device of Figure 6 taken on substantially the irregular line VII—VII.

In all forms of the present invention, relatively reciprocable cylinder and piston structures are operatively related in the presence of displaceable hydraulic fluid and in conjunction with control valve structure to dampen the relative movements of the parts of apparatus with which the particular damping device is associated. Leakage from the cylinder past the piston structure is positively prevented by a novel flexible sealing sleeve structure. In addition, all forms of the damping mechanism embody an improved anti-frothing and air-pocket preventing means which preferably maintains a continual replenishment pressure on the hydraulic fluid. A novel control valve assembly is also provided.

Having more particular reference to the form of the damping mechanism shown in Figures 1 and 2, identified generally by the reference numeral 9, a cylinder structure 10 and a piston structure 11 are cooperatively related to define a high pressure chamber 12 and a low pressure chamber 13 adapted to be filled with hydraulic fluid and between which displacement of the fluid in the relative reciprocations of the structures is controlled by a valve assembly 14. The construction and operation of the valve assembly 14 is such as to provide for one-way damping, yieldable resistance being afforded to relative reciprocal movement of the cylinder and piston structures in one direction but rapid relative reciprocal movement being permitted in the opposite direction.

Accordingly, the cylinder structure 10 includes a radially flanged head 15 which has a preferably centrally outwardly protruding eye 17 for connection to one relatively movable part of apparatus to be controlled. An integral inwardly extending preferably smaller diameter hollow cylinder 18 on the head 15 is internally dimensioned to receive an elongated, tubular piston member 19 in closely slidable relation.

At its inner end, the tubular piston member 19 provides a mount for the valve structure 14, and accordingly is formed with an internal rabbet groove 20, at such end within which is received a valve seat and supporting disk 21 secured within the groove as by upsetting the edge of the piston tube to form a retaining flange 22. The supporting disk 21 provides a barrier which substantially closes off the interior of the piston tube 19 and thereby the low pressure chamber 13 from the high pressure chamber 12 within the cylinder 18. Relatively free flow of hydraulic fluid from the low pressure chamber 13 to the high pressure chamber 12 is permitted by a plurality of low pressure fluid ports 23 extending in an annular series through the disk 21 and providing a relatively large combined cross-sectional flow area. Reverse flow of hydraulic fluid, that is, from the high-pressure chamber to the low-pressure chamber through the ports 23 is prevented by a flutter type of check valve comprising a thin ring disk 24 supported in freely axially movable position close to the high-pressure side of the supporting disk member 21 by a collar element 25 carried by the adjacent protruding end of a valve stem 27 which extends through a central bore 28 in the supporting disk 21 to protrude a short distance on the high-pressure side and a substantial distance on the low-pressure side. Means, such as a horseshoe washer 29 secured within an annular groove 30 in the adjacent end portion of the stem 27, holds the valve-retaining collar 25 in place against endwise displacement from the stem.

Displacement of hydraulic fluid from the high-pressure chamber 12 to the low-pressure chamber 13 is provided for through a passageway comprising an axial bore 31 of limited length extending axially into the inner end portion of the valve stem 27 and opening laterally from the stem on the low-pressure side of the supporting disk member 21 through a substantial slot 32. Normally, passage of hydraulic fluid in either direction through the high-pressure passageway 31, 32 is blocked by a sleeve blow-off valve 33 which is slidably mounted about the stem 27 within the low-pressure chamber 13 and is urged against its valve seat, provided by the opposing face of the supporting disk member 21, by a preloaded helical compression spring 34. This spring freely encircles the valve stem 27 and abuts a spring retainer 35 which may be a horseshoe washer received in an annular groove 36 adjacent to the outer end of the stem. The force of the spring 34 acting inwardly upon the sleeve valve 33 and driving outwardly on the stem 27 against the retainer 35 may be relied upon to maintain the check valve assembly at the inner end of the valve stem in proper axial position by tending to draw the valve stem outwardly within its bore 28 in the supporting disk member 21.

Blow-off from the high pressure chamber 12 occurs when sufficient pressure is developed in the hydraulic fluid therein by compression of the cylinder and piston to act upon a blow-off shoulder 37 formed adjacent to the blow-off slot 32 by a slight internal enlargement of the sleeve valve 33. This drives the sleeve valve 33 against the pressure of the spring 34, which is thereby compressed substantially as indicated at Figure 2, and the valve slides open relative to the egress slot 32 of the blow-off passageway. At the same time, of course, the check valve 24 closes the low-pressure ports 23. As soon as the blow-off pressure has been relieved, the sleeve valve 33 snaps back into closed position and again blocks the blow-off passageway so that hydraulic fluid to be displaced from the low-pressure chamber 13 passes through the low-pressure apertures 23.

Means is provided to receive from the low-pressure chamber 13 the hydraulic fluid displaced by the mass of the piston, in the present instance comprising a chamber 38 provided at the outer end of the piston structure 11 by a substantially cup-shaped closure cap 39 and threaded into a substantially outwardly opening cup-shaped head 40 integral with the outer end of and of substantially larger diameter than the piston tube 19. At its outer end, the cap 39 is preferably formed with an eye 41 which is longitudinally aligned with the cylinder-carried eye 17 for attachment to the opposite of the movable elements of the apparatus to be controlled by the damping mechanism 9.

Aeration or frothing or air-pocket formation within the hydraulic system of the damping mechanism 9 is prevented by maintaining the system completely filled with hydraulic fluid preferably held under constant air-excluding pressure. In the present instance this is accomplished by the provision of yieldable pressure means in the displacement chamber 38 and comprises a reentrantly collapsible diaphragm 42 which may be formed from rubber or a rubber-like material and has a lateral annular flange 43 seated within the corners at the base of the cup of the piston head 40. There the flange 43 is clamped into fluid sealing relation by the inner edge of the closure cap 39 driving against an anti-buckling friction washer 44 formed with an annular axially extending rounded flange 45 interhookingly engaging the diaphragm flange. Thus, the diaphragm 42 divides the chamber 38 into a displaced-fluid receiving chamber 47 provided by the interior of the diaphragm and a closed air space in the remainder of the chamber 38 within which the air becomes compressed when the diaphragm 42 expands as the chamber 47 therein fills out with displaced hydraulic fluid. The pressure thus created tends to drive the diaphragm back toward collapsed position and thus aids in returning the displaced hydraulic fluid from the low pressure side to the high-pressure side of the system upon expansion of the damping device.

Loading the hydraulic system of the damping mechanism 9 with hydraulic fluid to completely fill it to an extent which maintains the diaphragm 42 slightly expanded, even in the operationally expanded condition of the mechanism, provides constant pressure upon the hydraulic fluid which avoids formation of any air pocket in the system. For filling purposes, a pair of filling ports 48 and 49 may be provided in the cylinder head 15 through one of which hydraulic fluid may be inserted while the other serves as an air exhaust port during such operation. These ports are preferably closed by screw plugs 50, the heads of which are driven against sealing gaskets 51. By filling the damper with fluid in its utmost extended or expanded condition, and then maintaining it slightly compressed in its working relationship in the apparatus to be controlled, the hydraulic fluid will at all times be under a slight pressure at the normal working length of the damper. This is also advantageous in that it allows for fluid contraction at low temperatures and assures positive replenishment at all times.

Since the present damper mechanism 9 is adapted for use in places where damping in one direction, namely, on a power stroke, is all that the damper must accomplish, means is preferably provided for automatically returning the damper to expanded condition, and herein comprises a helical compression spring 52 which is operative between the cylinder head 15 and the piston head 40. By preference, the return spring 52 is maintained under load and confined as to its limit of expansion. To this end, the spring is mounted within a casing or shell structure comprising a pair of telescopically related cylindrical shells 53 and 54 which may be formed from sheet metal and with the latter slidably received within the former. The outer shell 53 has an inwardly radially extending annular end flange 55 providing one end abutment for the return spring, and the inner shell 54 has an inwardly projecting opposite annular end flange 57 providing an abutment for the opposite end of the spring. In order to limit the extent of relative protraction of the shells 53 and 54 under the influence of the spring 52, the inner shell 54 is provided with a diametrically opposite pair of outwardly projecting narrow flanges or lugs 58 which are received for longitudinal reciprocal movement within respective longitudinally extending slots 59 formed for this purpose in the wall of the outer shell 53. The ends of the slots 59 adjacent the inner end of the shell 53 provide respective limit stops engageable by the lugs 58 and thus determine the extent to which the shells may be protracted by the spring 52. Only one of the lugs 58 and corresponding slot 59 is shown in Figure 3, but it will be understood that the lug and slot structures on the opposite side are similar to provide a balanced relationship.

In addition to housing the return spring 52, the telescopically related shell structure 53, 54 may also include as a unit therewith means for affording a positively leakproof seal between the cylinder 18 and the piston 19. The principal element of such a seal is a flexible sleeve 60 formed from a material in the nature of rubber. This sealing sleeve 60 is of a diameter to fit snugly about the cylinder 18 and has one edge thereof turned outwardly upon itself and clamped by a return bent flange 61 to the inner margin of a sheet metal sleeve or casing member 62. The latter has an internal diameter great enough to accommodate the sealing sleeve 60 freely in doubled over condition and an external diameter which will just clear the inner surfaces of the coils of the spring 52. At its outer end the seal casing 62 has a radially outwardly extending annular retaining flange 63 which is adapted to seat upon the spring abutment flange 55.

At its free edge the flexible seal sleeve 60 is formed with opposite, respectively radially inwardly and radially outwardly extending flanges 64 and 65 by which it is adapted to be secured sealingly to the cylinder head 15. To this end, an annular external undercut groove 64a is provided about the base end of the cylinder 18 to receive the seal flange 64 substantially interlockingly. The innermost annular portion of the spring abutment casing flange 57 is frusto-conically inwardly convergently formed complementary to an outwardly flaring beveled surface on the flange 65. In the assembled relationship of the return spring and seal structure with the cylinder, the inner beveled portion of the abutment flange 57 firmly presses sealingly against the seal flange 65 and thereby urges the radially inward seal flange 64 firmly into the groove 64a not only to effect a thorough fluid seal but also to hold the sealing sleeve 60 interlocked with the cylinder 18 against longitudinal inward displacement along the cylinder.

In order to facilitate assembly of the sealing sleeve 60 both with the return spring unit and also with the cylinder structure 10, means is provided for restraining the return spring 52 from expanding the shells 53 and 54 to their telescopic limits, in the initial assembly of the device. For this purpose an offset entry slot 66 is provided for each of the lug clearance slots 59 and opens thereinto at its inner end through a narrow lateral passage 67 defined at its outer side by a tongue 68 within the cylindrical plane of the shell 53. This tongue is adapted to provide a solid limiting rest for the associated limit lug 58 substantially as shown in full line in Figure 3, thereby holding the telescoped shells in return-spring-compressing relationship sufficient to clear the flanged end of the sealing sleeve 60 when the latter is initially assembled with the spring unit. Then when the sealing sleeve has been assembled about the cylinder 18, a slight rotation of the outer shell 53 relative to the inner shell 54 carries the limit lugs 58 into the respective slots 59 and the spring 52 is thereby permitted to expand and push the retainer flange 57 against the opposing sealing sleeve flange 63. (Full line position Figure 2 and broken line position Figure 3.)

To receive the inner end of the return spring and fluid sealing unit substantially concentrically, the piston head 40 is provided with a rabbet groove 69 adapted for snugly receiving the shoulder provided by the adjacent edge of the seal-retaining shell 62 and its end flange 63, a sealing gasket 70 in the corner of the groove leakproofing the joint. Since the spring 52 drives the end flange 63 into tightly seating relation in the groove 69, a tight joint prevails at all times.

Entirely enclosing the working structure of the damper is means such as a casing sleeve 71 which is secured fixedly to the edge of the flange of the cylinder head 15 concentric with the cylinder 18 and is internally dimensioned to serve as an aligning bearing for the piston head 40 as well as the outer shell 53. In this relationship, the piston head 40 and the sleeve 71 cooperate as a piston rod and its bearing.

In operation, one of the eyes 17 or 41 of the damper 9 may be attached to a stationary member of the apparatus to be damped and the other eye attached to a moving member. As the moving member effects relative compression of the cylinder structure 10 and the piston structure 11, hydraulic fluid is forced from the pressure chamber 12 and through the blow-off passageway 31, 32 and past the blow-off sleeve valve 33 into the low-pressure chamber 13. During this activity, there will also be flow of hydraulic fluid through radial ports 72 in the wall of the piston 19 from the space between the piston and the sealing retainer shell 62, this space, in effect, serving as a part of the low-pressure chamber volume. The displacement of the hydraulic fluid from the high-pressure chamber 12, as the damper is compressed, encounters resistance in passage through the blow-off passage and past the blow-off valve 33 which effects absorption of energy and thus dampening of the relative motion of the controlled apparatus. At the same time, the return spring 52 is compressed or loaded, and back pressure is built up against the expanded diaphragm 42 by compression of air in the displacement chamber 38. Thus, when the dampened power stroke has been completed, the return spring 52 and the diaphragm 42 expend their stored energy and quickly return the damper to expanded condition by driving the hydraulic fluid through the return ports 23 into the high-pressure chamber 12.

During the contraction of the damper, the sealing sleeve 60 folds into the space between the sealing sleeve retainer 62 and the cylinder 18, and as the damper expands the folded portion of the sleeve is taken up. By having the sealing sleeve 60 of sufficient length to free it from pulling strain or stretching in the operationally expanded condition of the damper, it is relieved from any tendency to disrupt the thorough sealing attachment thereof, and a perfectly sealed relationship is maintained. The sealing sleeve retainer provides a shield between the spring 52 and the sealing sleeve 60 in the operation of the mechanism.

Although the return spring 52 functions usefully to return the damper mechanism automatically to expanded operational condition in those circumstances where no return means is present in the apparatus to be damped, it may serve optionally merely as sealing sleeve retainer and supplementary return medium where said apparatus is equipped for self-return. On the other hand, where for any reason use of the spring 52 would prove objectionable in the operation of the apparatus to be damped, or for any other reason, it may be eliminated and suitable fixed means provided in the damper mechanism for maintaining the fluid sealing relation of the sealing sleeve structure between the cylinder and piston structures.

In the form of the invention shown in Figures 4 and 5, which embodies a one-way damper, identified as 73, provision is made for adjustment of the blow-off resistance to action of the blow-off valve from a point exteriorly of the damper. Accordingly, the damper 73 includes a cylinder housing 74 in which there are a plurality of cavities affording chambers to accommodate the operating piston, the control valve structure, and the displacement space. A cylinder chamber 75 is internally dimensioned for axial sliding co-operation with a piston 76 which may be formed as a centrally apertured piston disk secured in place as by a clamping nut 77 on a reduced diameter end portion of a relatively long piston rod 78. The latter is slidingly bearinged in an axially apertured bearing plug 79 which is threadedly secured in one end of the cylindrical cavity or bore which provides the cylinder chamber 75. For securing the damper in an apparatus to be damped, the outer end of the piston rod 78 may be provided with an eye structure 80, while longitudinally aligned therewith and protruding integrally from the opposite end of the cylinder housing 73 is a second oppositely extending connecting eye 81.

A thorough fluid seal between the cylinder and the piston rod 78 is afforded by a sealing sleeve 81 which is preferably made from a flexible, rubber-like material and is dimensioned to embrace the outer end portion of the piston rod snugly. At its outer end the sealing sleeve 81 is securely fastened to the head end of the piston rod 78 as by means of a crimped ferrule 82 which engages and clamps a radially outwardly annular flange 83 or turned margin on the sleeve to a complementary radial flange 84 on the piston rod head. At its opposite or inner end, the sealing sleeve is secured by means such as a substantially channel-shaped sheet metal connecting ring member 85 to an axially outwardly extending annular flange 87 on the bearing plug 79. As shown in Figure 5, the channel-shaped connector 85 engages an outwardly turned back marginal portion of the sleeve 81 and clamps it and a radially outwardly annular flange portion 88 thereof against the end of the plug flange 87, the outer edge of the clamping ring being crimped interlockingly into an annular groove 89 in the outer periphery of the plug flange.

Within the plug flange 87 and extending inwardly therebeyond into the bearing plug 79 is an axially elongated chamber about the piston rod 78 to receive the inward fold of the sealing sleeve 81 as the piston is moved to retracted position within the cylinder chamber 75 in the operation of the damper. By preference, the sealing sleeve 81 is of such a length that in the fully operationally extended position of the piston rod 78 the sleeve will remain unstretched and thus free from any danger of the sealingly clamped ends thereof being withdrawn or disrupted to disturb the seal. Since the sealing sleeve 81 embraces the piston rod 78, it will at all times remain snugly thereabout and move freely therewith through the annulus of the clamping channel 85 during operation of the device.

A fluid-tight seal between the bearing plug 79 and the adjacent end of the cylinder housing 74 may be effected as by means of a sealing gasket 91 secured by an integral radially extending clamping flange 92 upon the plug. A pressure relief port 93 extends through the bearing plug 79 from the seal-fold chamber 90 to the low-pressure side of the piston.

At the high-pressure side of the piston 76, the cylinder chamber 75 communicates by way of a lateral passageway 94 with a control valve chamber 95. Mounted operatively within the valve chamber 95 is a control valve structure 97 which is functionally substantially like the control valve structure 14 already described.

The valve structure 97 comprises a supporting disk member 98 which is secured across the inner end portion of the chamber 95 just outwardly of the passageway 94 by seating against an annular shoulder 99 formed in the wall of the chamber and against which the disk is clamped by a relatively thin wall clamping tube 100 which bears against the outer margin of the disk and is secured in axial position by a nut 101 threaded into the bore of the chamber 95 just inwardly of a lateral passageway 102 communicating with the low-pressure side of the piston 76 adjacent to the outer end of the bore providing the piston chamber 75. An annular series of low-pressure fluid flow ports 103 through the supporting disk 98 are controlled against high-pressure flow by a flutter type of valve comprising a thin disk 104 held in position on the high-pressure side of the supporting disk by a retaining collar 105 encircling a reduced diameter portion 107 of a valve stem 108 which extends axially through the supporting disk and has a groove 109 just beyond the retaining collar to receive a horseshoe washer 110 by which the retainer collar is secured in place.

A high-pressure passageway through the valve stem 108 is provided by an axial bore 111 which extends through the reduced diameter portion 107 from the high-pressure side of the supporting disk to the opposite side thereof and opens through a lateral port 112 which is controlled by a blow-off sleeve valve 113 slidably disposed about the valve stem and having a pressure responsive internal shoulder 114. The blow-off sleeve valve 113 is normally held in sealing relation by being urged against the seat provided therefor by the adjacent face of the supporting disk 98 by a helical compression spring 115 encircling the valve stem 108.

In order to permit adjustment of the tension of the spring 115, it is formed substantially longer than the valve stem 108 and extends at its outer end portion about a hollow guide stem 117 of an adjusting and closure plug member 118 which is adjustably threaded into the outer end of the bore providing the valve chamber 95 and is dimensioned to afford a fluid flow space thereabout passing through the nut 101. A shoulder 119 on the adjusting and closure plug is engaged by the outer end of the blow-off valve spring 115 and is adapted to vary the tension or load upon the spring by screwing the plug inwardly or outwardly within the spring chamber bore. A relatively large transverse bore 120 affords free fluid flow communication with the hollow guide stem 117, thereby avoiding any blocking of free flow of hydraulic fluid within the device due to having the plug extending into the valve chamber. A thorough fluid seal between the plug 118 and the wall of the valve chamber is provided by a thread sealing gasket 121 accommodated in an annular groove 122 in the threaded periphery of the plug.

Communication is afforded between the low pressure end of the valve chamber 95 and a displacement chamber 123 by a transverse passageway 124. The purpose of the displacement chamber 123 is, of course, to allow for displacement of hydraulic fluid by the piston rod 78 in the operation of the damper. Within the displacement chamber is means for compensating for the variation in fluid volume that it is called upon to accommodate, such compensating means comprising in the present instance an elongated substantially cylindrical capsule 125 of a flexible rubber-like material and which has a body of air sealed therein. By preference the compensator capsule 125 is formed with an annular spacer rib 127 engageable with the surrounding wall of the bore of the chamber 123 to maintain the capsule in freely spaced relation, thus enhancing its compensating function. A closure plug 128 for the outer end of the displacement chamber bore 123 carries a thread seal 129 to prevent fluid leakage and has a reduced diameter inwardly projecting buffer boss 130 for holding the compensator capsule out of blocking relation to the communicating fluid passage 124. Thereby free communication is assured at all times between the valve chamber 95 and the displacement chamber 123.

In a convenient compact arrangement, the communicating piston, valve and displacement chamber 75, 95 and 123, respectively, are disposed in a triangular arrangement within the casing 74, substantially as shown in Figure 4, and the outer shape of the casing may accordingly be generally triangular in end elevation.

Prior to installing the damping unit 73, it is filled with hydraulic fluid, preferably while both the closure plugs 118 and 128 are removed and with the piston 77 in its extreme protracted position. The open chambers are then sealed. When the unit is installed, however, the piston will ordinarily be in a somewhat retracted position even when at the extreme outer limit of its working stroke. This places the hydraulic fluid within the device under a slight pressure which allows for contraction of the fluid due to lowering temperature and also assures that the hydraulic system will be kept free of air which might cause frothing or otherwise disrupt proper operation of the device. Operation of the damper will therefore be smooth and positive at all times.

On the power stroke, the piston 75 drives the hydraulic fluid ahead of it on the high-pressure side of the cylinder chamber 74, which causes a blow-off through the valve assembly 97 into the major volume of the valve chamber 95 constituting a low-pressure chamber in combination with the low-pressure side of the cylinder chamber 74. Displaced hydraulic fluid passes through the passageway 124 over the displacement chamber 123, causing the compensator capsule 125 to collapse to an adequate extent. At the same time, the fluid sealing sleeve 81 folds into the fold-receiving chamber 90 which vents through the port 93 into the low-pressure chamber. Upon reversal of the piston 75, hydraulic fluid returns to the high-pressure side of the cylinder chamber 74 through the low-pressure ports 103 and past the check valve 104, the piston-created suction being augmented by the pressure exerted by the expanding compensator capsule 125.

Where two-way damping is required, a damping unit 131, as shown in Figures 6 and 7, will be utilized. This unit is substantially like the damping unit 73, shown in Figures 4 and 5, but with such variations in structure as adapt it for two-way damping. A one-piece cylinder housing 132 is bored from one end to provide a cylinder chamber 133, a valve chamber 134 and a fluid displacement chamber 135. A piston 137 is longitudinally slidably operative within the cylinder chamber 133 and has a piston rod 138 extending from the open end of the chamber and reciprocably guided by a bearing plug 139 threaded into closing relation to the chamber. The fluid sealing sleeve 81 for the piston rod 138 is the same as that for the damping unit 73 and similar reference numerals indicate identity of details. Within the closure and bearing plug 139, a sealing sleeve fold chamber 140 communicates for pressure relief and bleed-off purposes through a lateral port 141 with an encircling channel 142 communicating through a small passageway 143 with the displacement chamber 135 where low pressure prevails. Fluid leakage past the plug 139 is prevented by a sealing gasket 144 clamped between a lateral flange 145 on the plug and a recessed shoulder 147 opposing the same within the adjacent end of the cylinder body 132.

Oppositely extending longitudinally aligned eyes 148 and 148a on the cylinder body 132 and on the outer end of the piston rod 138, respectively, provide means for attachment of the damper 131 to apparatus to be damped with which it is installed.

At its inner and outer ends, the cylinder chamber 133 communicates by way of transverse passages 149 and 150, respectively, with the opposite ends of the valve chamber 134. In the extent of the valve chamber between the communication passages 149 and 150, is disposed a two-way valve structure 151, including a valve stem 152 carrying an identical valve assembly at each end thereof. For this purpose, each end of the valve stem 152 has a reduced diameter portion 153 providing a shoulder at the base thereof for a supporting disk 154 having an annular axially extending series of low-pressure ports 155 controlled on the high-pressure side thereof by a disk check valve 156 held in operative relationship by a retaining collar member 157 which is secured in place by means such as a horseshoe washer 158 fitting in an annular groove 159 in the reduced diameter stem end. At each end of the stem, a high pressure blow-off passageway provided by an axial bore 159a and a lateral port 160 communicating with the low-pressure side of the valve assembly is controlled by a sleeve type pop-off valve 161 which is like and functions the same as the pop-off sleeve valve 33 and 113 previously described. A preloaded helical compression spring 162 works against both of the pop-off sleeve valves 161.

Adjacent to the inner end of the valve chamber 134, the supporting disk 154 is seated against an annular outwardly facing shoulder 163 while adjacent to the opposite end of the chamber the supporting disk 154 is engaged by the inner end of a retaining tube 164 which is driven thereagainst by a sealing closure plug 165 threaded into the outer end of the bore providing the valve chamber. A longitudinal slot 167 in the retaining tube 164 provides clearance at the hydraulic fluid passageway 150. Through this mounting of the valve structure 151, ample clearance is afforded at each end thereof for communication with the cylinder chamber 133 through the respective ports 149 and 150, while the space between the supporting disks 154 affords a low-pressure chamber area which communicates preferably and about its midpoint with the displacement chamber 135 through a port 168.

Within the displacement chamber 135, the cylindrical capsular compensator 125 is disposed in freely longitudinally floating relation while the lateral flange 127 thereon maintains it in sufficient spaced relation to the wall of the chamber 135 so that it will avoid blocking ingress and egress of hydraulic fluid through the communicating passageway 168. A thread-sealed plug 169 closes and seals the outer end of the bore which provides the displacement chamber 135.

Similarly, as in the case of the damper unit 73, the damper unit 131 is completely filled with hydraulic fluid in a manner to avoid all free air within the hydraulic system thereof which might in any way cause frothing or air bubbles or pockets to form within the device. In the damper 131, each stroke of the piston 137 is a power stroke so that the side toward which the piston is advancing is the pressure side while the opposite side, conversely, is the low-pressure side, alternately as the piston reciprocates. Fluid displaced into the displacement chamber 135 in the operation of the piston acts similarly as in the case of the damper unit 73 to compress the compensator capsule 125, which in turn creates a back pressure assisting in returning the hydraulic fluid to the low pressure side of the piston.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. In combination in a damping mechanism, a cylinder structure, a piston structure cooperable reciprocably with the cylinder structure, said structures including opposite head portions, a return spring acting between said head portions normally to drive the cylinder and piston structures into protracted relation, a sealing sleeve affording a fluid tight seal between the cylinder and piston structures, means at one end of the sleeve urged by said spring against an end portion of the sealing sleeve to secure the latter to the head of the cylinder structure, and means secured to the opposite end portion of the sealing sleeve and to the piston structure for connecting said sleeve with said piston structure, said last mentioned means extending as a shield between the spring and the sealing sleeve in the operation of the mechanism.

2. In combination in a damping mechanism, a cylinder structure, a piston structure cooperably reciprocable within the cylinder structure, a foldable sealing sleeve of substantial length encircling said cylinder structure, means securing one end portion of the sleeve to the head end portion of the cylinder structure, a sleeve secured to the piston structure adjacent to the head end thereof externally of the cylinder structure and of an internal diameter larger than the cylinder structure to accommodate the sealing sleeve in folded condition between the cylinder structure and the sleeve, the proximate end portions of the sealing sleeve and said piston carried sleeve being secured together sealingly, said sealing sleeve folding upon itself in the space between said cylinder structure and said piston carried sleeve during retractional relative movements of the piston and cylinder structure, said cylinder structure and said piston having head end portions projecting laterally beyond the outer diameter of said piston carried sleeve, and a coiled compression spring acting between said laterally extending portions normally to maintain said cylinder structure and piston in relative protracted condition, said piston carried sleeve providing a spacer between said spring and said sealing sleeve.

3. In combination in a damping mechanism, a cylinder structure, a piston structure cooperably reciprocable within the cylinder structure, a foldable sealing sleeve of substantial length encircling said cylinder structure, means securing one end portion of the sleeve to the head end portion of the cylinder structure, a sleeve secured to the piston structure adjacent to the head end thereof externally of the cylinder structure and of an internal diameter larger than the cylinder structure to accommodate the sealing sleeve in folded condition between the cylinder structure and the sleeve, the proximate end portions of the sealing sleeve and said piston carried sleeve being secured together sealingly, said sealing sleeve folding upon itself in the space between said cylinder structure and said piston carried sleeve during retractional relative movements of the piston and cylinder structure, said cylinder structure and said piston having head end portions projecting laterally beyond the outer diameter of said piston carried sleeve, and a coiled compression spring acting between said laterally extending portions normally to maintain said cylinder structure and piston in relative protracted condition, said piston carried sleeve providing a spacer between said spring and said sealing sleeve, one of said laterally extending portions carrying a casing sleeve which encloses said spring.

4. In combination in a damping mechanism of the character described, a cylinder structure including a cylinder portion, a piston structure including a piston portion operatively reciprocably disposed within the cylinder portion, said cylinder structure having a head portion projecting laterally to a substantially greater diameter than the cylinder portion, said piston structure having a head portion projecting laterally to a substantially greater diameter than the piston portion, one of said head portions carrying a casing sleeve projecting into slidable cooperative relation to the other of said head portions, said sleeve affording a substantial annular space between its inner wall and said cylinder portion, a compression spring housed in said space and acting between said head portions normally to drive the cylinder structure and the piston structure into protracted relation, and sealing sleeve means secured to said head structures interiorly of said spring.

5. In combination in a damping mechanism of the character described, a cylinder structure including a cylinder portion, a piston structure including a piston portion cooperatively reciprocably disposed within the cylinder portion for displacing hydraulic fluid in the relative reciprocal movements of the cylinder and piston structures, both of said structures having head portions providing opposing lateral shoulders extending laterally beyond the cylinder portion, said shoulders having a return spring and sealing unit cooperative therebetween, said unit including a compression spring encircling said cylinder portion and having the ends of the spring in thrust relation to the respective opposing shoulders, and a sealing sleeve structure interposed between the spring and the cylinder and piston portions and comprising a relatively rigid sleeve member having a lateral flange interposed between one end of the spring and the shoulder against which it thrusts and a flexible sealing sleeve member sealingly connected to the rigid sleeve member and with clamping means engaging the remaining end portion of the flexible sleeve and interposed between the contiguous end portion of the spring and the associated shoulder against which it thrusts for thereby driving the clamping means into clamping relation to the engaged end portion of the flexible sleeve.

6. In combination in an apparatus of the character described, a sealing assembly comprising a pair of substantially rigid concentric shell members of different diameters disposed one within the other and having respective end flanges in abutting relation, a cylindrical compression spring dimensioned to fit within the annular space between said shell members and thrusting at one end toward said end flanges, the inner of said shell members having attached to its free end portion one end of a flexible sleeve, the opposite end of said flexible sleeve having a flange directed radially outwardly, and a relatively rigid sleeve member telescopically slidably related to the outer of said shell members and having an inturned flange engaged by the contiguous end portion of the spring thrustingly and adapted to engage clampingly against said flange on the flexible sleeve member to clamp the latter flange in place against a structure with which the sealing assembly is assembled.

7. In combination, a sealing assembly comprising a pair of spaced concentric shells, one end portion of one of said shells being disposed within an end portion of the other of said shells, said shells having spring retaining means at their respective remote ends, a compression spring acting between said means and normally tending to protract the shells relative to one another, a sealing sleeve concentric with the shells and attached sealingly to one of said shells and arranged to extend to the remote end of the remaining shell, means on said remaining shell and on said sleeve interengageable for clamping the outer end of said sleeve against a surface with which sealing engagement is to be effected, and releasably interengageable means cooperatively related to said shells for retaining the shells in partially relatively retracted condition upon compression of said spring and releasable at will for releasing the shells for relative protraction responsive to expansion of the spring.

8. In combination in a damping mechanism of the character described, a cylinder structure having a cylinder portion, a piston structure having a piston portion reciprocably cooperating within the cylinder portion to displace hydraulic damping fluid carried within the cylinder portion, said piston portion being hollow and having a part thereof normally projecting beyond the end of the cylinder portion into which the piston portion projects, said part of the piston portion having a fluid displacement passage from the hollow interior of the piston portion for displacement of fluid from within the piston portion and exteriorly thereof, fluid displacement valve control structure carried within said hollow piston portion, said cylinder portion having an annular groove in the external wall thereof, a rigid cylindrical sleeve of larger diameter than said cylinder and piston portions and encircling said part of the piston portion, said sleeve having an end thereof sealingly connected to said piston structure concentrically about the piston portion and defining a chamber about said part of the piston portion, a flexibly yieldable sleeve member sealingly connected to the free end portion of said rigid cylindrical sleeve and having an opposite end portion provided with a flange fitting into said annular groove, and means sealingly securing said flange in said groove so that the flexibly yieldable sleeve provides a yieldable seal for said chamber accommodating reciprocal movements of said rigid sleeve member with said piston structure.

GERVASE M. MAGRUM.

References Cited in the file of this patent

UNITED STATES PATENTS

| Number | Name | Date |
|---|---|---|
| 491,794 | Barker | Feb. 14, 1893 |
| 867,570 | Clark | Oct. 8, 1907 |
| 1,205,106 | Oxnard | Nov. 14, 1916 |
| 1,373,711 | Bourne | Apr. 5, 1921 |
| 1,497,063 | Brehmer | June 10, 1924 |
| 1,628,749 | Samuels | May 17, 1927 |
| 1,991,043 | Bates | Feb. 12, 1935 |
| 2,083,661 | Olley | June 15, 1937 |
| 2,099,240 | Sproul | Nov. 16, 1937 |
| 2,161,811 | Grebe | June 13, 1939 |
| 2,212,259 | Binder | Aug. 20, 1940 |
| 2,327,295 | Whisler | Aug. 17, 1943 |
| 2,335,907 | Boor et al. | Dec. 7, 1943 |
| 2,357,278 | O'Connor | Aug. 29, 1944 |
| 2,451,171 | Mullen | Oct. 12, 1948 |

FOREIGN PATENTS

| Number | Country | Date |
|---|---|---|
| 216,183 | Switzerland | Nov. 17, 1941 |
| 228,810 | Switzerland | Dec. 1, 1943 |
| 478,591 | Great Britain | Jan. 20, 1938 |